United States Patent
Adam et al.

(10) Patent No.: US 9,428,666 B2
(45) Date of Patent: Aug. 30, 2016

(54) HYDROPHILIC SELF-CLEANING COATING COMPOSITIONS

(71) Applicant: EMPIRE TECHNOLOGY DEVELOPMENT LLC, Wilmington, DE (US)

(72) Inventors: Georgius Abidal Adam, Edensor Park (AU); Angele Sjong, Louisville, CO (US); William Brenden Carlson, Seattle, WA (US); Feng Wan, Issaquah, WA (US); Timothy Martin Londergan, Seattle, WA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 14/778,977

(22) PCT Filed: Mar. 22, 2013

(86) PCT No.: PCT/US2013/033460
§ 371 (c)(1),
(2) Date: Sep. 21, 2015

(87) PCT Pub. No.: WO2014/149052
PCT Pub. Date: Sep. 25, 2014

(65) Prior Publication Data
US 2016/0046826 A1 Feb. 18, 2016

(51) Int. Cl.
*B32B 7/12* (2006.01)
*C08F 16/12* (2006.01)
(Continued)

(52) U.S. Cl.
CPC ............ *C09D 133/12* (2013.01); *C04B 14/18* (2013.01); *C04B 14/185* (2013.01); *C04B 26/02* (2013.01);
(Continued)

(58) Field of Classification Search
CPC ............ C08K 9/04; C08K 7/26; C08K 5/17; C09D 133/12; C04B 14/18; C04B 14/185; C04B 26/32; C04B 26/04; C04B 26/02; C04B 14/307; C04B 24/383; C04B 20/1022; C04B 22/00; C04B 24/01; C04B 24/122; C04B 2111/2069
USPC .......................................... 524/186; 526/332
See application file for complete search history.

(56) References Cited

U.S. PATENT DOCUMENTS

| | | |
|---|---|---|
| 4,374,126 A | 2/1983 | Cardarelli et al. |
| 4,686,253 A * | 8/1987 | Struss .................. C04B 14/185 106/409 |

(Continued)

FOREIGN PATENT DOCUMENTS

| | | |
|---|---|---|
| WO | 2007102825 A1 | 9/2007 |
| WO | 2012009384 A1 | 1/2012 |

OTHER PUBLICATIONS

"Chemical Composition and Mineralogy," Accessed at https://web.archive.org/web/20090106125237 1http://www.perlite.info/hbk/0031404.html, Accessed on Sep. 10, 2015, p. 1.

(Continued)

*Primary Examiner* — William Cheung
(74) *Attorney, Agent, or Firm* — Dorsey & Whitney LLP

(57) ABSTRACT

Hydrophilic, self-cleaning coating compositions and methods to make and use the compositions are disclosed. The coatings comprise perlite and/or expanded perlite that are activated with hydrophilic agents. The perlites when incorporated in paints provide hydrophilic, self-cleaning and/or biocidal property to the coating.

30 Claims, 1 Drawing Sheet

Binder particles dispersed in water

Binder particles pack against each other as the water evaporates

Activated expanded perlite attached to the coalescing agents migrate to the surface

(51) Int. Cl.
    C09D 133/12    (2006.01)
    C04B 14/18     (2006.01)
    C04B 26/02     (2006.01)
    C04B 26/04     (2006.01)
    C04B 26/06     (2006.01)
    C04B 26/32     (2006.01)
    C08K 9/04      (2006.01)
    C04B 111/00    (2006.01)
    C04B 111/20    (2006.01)
    C08K 5/17      (2006.01)
    C08K 7/26      (2006.01)

(52) U.S. Cl.
    CPC ............... *C04B 26/04* (2013.01); *C04B 26/06* (2013.01); *C04B 26/32* (2013.01); *C08K 9/04* (2013.01); *C04B 2111/00482* (2013.01); *C04B 2111/2069* (2013.01); *C08K 5/17* (2013.01); *C08K 7/26* (2013.01)

(56) References Cited

U.S. PATENT DOCUMENTS 5,028,458 A    7/1991  Mineck
6,712,898 B2   3/2004  Palm et al.
2007/0065475 A1*  3/2007  Elfersy .................. A01N 33/12
                                                    424/405

OTHER PUBLICATIONS

"Perlite P3 Cryogenic," Accessed at https://web.archive.org/web/20130126023650/http://www.william-sinclair.co.uk/industrial/products/perlite/P3_Cryogenic, Accessed on Sep. 10, 2015, pp. 2.

Bückmann, A.J.P., et al., "Self-Crosslinking Polymeric Dispersants and Their Use in Emulsion Polymerisation," International Waterborne, High Solids, and Powder Coatings Symposium, pp. 1-20 (Feb. 6-8, 2002).

Chou, M-S., and Shiu, W-Z., "Bioconversion of Methylamine in Biofilters," Journal of the Air & Waste Management Association, vol. 47, Issue 1, pp. 58-65 (Jan. 1997).

International Search Report and Written Opinion for International Patent Application No. PCT/US2013/033460 mailed Mar. 11, 2014.

Simon, J., "Hydrophilic Coatings Market Misinformation," Accessed at https://web.archive.org/web/20120119053623/http://info.biocoat.com/bid/112884/hydrophilic-coatings-market-misinformation, Dated Jan. 4, 2012, pp. 2.

Tyson, R.V., et al., "Reconciling pH for Ammonia Biofiltration and Cucumber Yield in a Recirculating Aquaponic System with Perlite Biofilters," HortScience, vol. 43, Issue 3, pp. 719-724 (Jun. 2008).

* cited by examiner

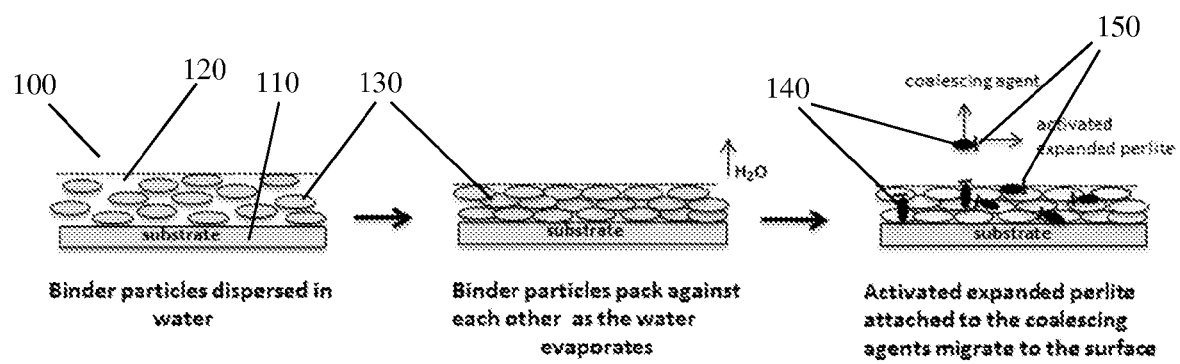

HYDROPHILIC SELF-CLEANING COATING COMPOSITIONS

This application is the U.S. National Stage filing under 35 U.S.C. §371 of PCT Application Ser. No. PCT/US2013/033460 filed on Mar. 22, 2013.

BACKGROUND

Coatings and paints are routinely used to beautify and protect substrates. The most simple coatings and paints are made of a polymer (the binder) in a solvent (the vehicle), which is commonly called a lacquer. Coatings and paints can modify the appearance of a substrate by adding color, gloss, or texture, and by blending with or differentiating from a surrounding environment. For example, a substrate surface that is highly light scattering can be made glossy by the application of a coating that has additives that result in a high gloss effect. Conversely, a glossy substrate surface can be made to appear flat by additives. Thus, the surface of the substrate can be hidden, altered, and ultimately changed in some manner by the presence of the coating. In addition, coatings may also protect the substrate from the surrounding elements and prevent or reduce corrosion of the substrate.

Paints and coatings, while protecting the substrate from the environment, can themselves become covered and contaminated with unwanted substances over time. The appearance of the coated surface of the substrate can often change in undesirable ways. Dirt, for example, can dull the coating by increasing light scattering or by modifying the color component of the coating. Dirt can also affect the coating's durability. It can often be expensive to clean the coated substrate, and detergents, surfactants, fragrances, alkali, lime, and/or other chemicals used to clean the coated substrate can make their way into the environment where they can potentially cause great damage. A hydrophilic surface allows water to spread out in a thin layer, thus sweeping dirt off the surface as the water thins out and trickles away. Thus, it is desirable to have a coating with a hydrophilic surface that keeps dirt from sticking to the surface, is self-cleaning, and which eliminates the need for environmental un-friendly chemicals.

SUMMARY

The current disclosure is directed to paints and coatings with hydrophilic and self-cleaning properties. In one embodiment, a coating composition may comprise activated perlite or activated expanded perlite. The activated perlite or the activated expanded perlite may further comprise a hydrophilic activating agent.

In an additional embodiment, a method of coating a substrate may comprise applying a coating composition to the substrate, wherein the coating composition comprises an activated perlite or an activated expanded perlite. The activated perlite or the activated expanded perlite may further comprise a hydrophilic activating agent.

In a further embodiment, a coated article may comprise a substrate and a coating composition applied on the substrate, wherein the coating composition comprises an activated perlite or an activated expanded perlite. The activated perlite or the activated expanded perlite may further comprise a hydrophilic activating agent.

In another embodiment, a method of making a coating composition may comprise contacting a perlite or an expanded perlite with a hydrophilic activating agent to form an activated perlite or an activated expanded perlite, and adding the activated perlite or the activated expanded perlite to the coating composition.

BRIEF DESCRIPTION OF THE FIGURE

FIG. 1 illustrates a coating with an activated perlite applied on a surface according to an embodiment.

DETAILED DESCRIPTION

This disclosure is not limited to the particular coatings, coating compositions, coating systems, coated articles and methods described, as these may vary. The terminology used in the description is for the purpose of describing the particular versions or embodiments only, and is not intended to limit the scope.

Perlite is a naturally occurring non-crystalline aluminosilicate. A typical chemical composition of perlite may include 70-75% $SiO_2$, 12-15% $Al_2O_3$, 3-4% $Na_2O$, 3-5% $K_2O$, 0.5-2% $Fe_2O_3$, 0.2-0.7% $MgO$, and 0.5-1.5% $CaO$. Conventional processing of perlite includes comminution (crushing and grinding) of the perlite ore, screening, thermal expansion, milling, and air size separation of the expanded perlite ore to meet the size specification of the finished product. For example, the perlite ore is crushed, ground, and separated to a predetermined particle size range. The separated material is heated in air at a temperature of about 870° C. to about 1100° C. in an expansion furnace, where the simultaneous softening of glass in the perlite ore and vaporization of contained water leads to rapid expansion of glass particles to form a frothy glass material with a bulk volume up to 20 times that of the unexpanded perlite ore. The expanded perlite ore is then air separated to meet the size specification of the final product. Depending on the quality of the perlite ore and the method of processing, perlite and expanded perlite products have been used as filter aids, lightweight insulating materials, filler materials, horticultural and hydroponic media, chemical carriers, and absorbents.

The present disclosure is directed to the use of perlite and/or expanded perlite dispersed in paints and coatings. In one embodiment, a coating composition may include an activated perlite or an activated expanded perlite. In some embodiments, the activated perlite and/or the activated expanded perlite may include at least one hydrophilic activating agent. The hydrophilic activating agent may include amines, ammonia, hydroxylamines, ethanolamine, ethanolamine derivatives, hydrazines, hydrazine derivatives, quaternary ammonium salts, and combinations thereof. Examples include, but are not limited to, propyl amine, dimethyl amine, hydrazine, diethanolamine, methylhydroxyl amine, dimethylhydroxyl amine, diethylhydroxyl amine, phenylhydroxyl amine, dihydrazine sulfate, acetylhydrazide, benzalkonium chloride, benzethonium chloride, methylbenzethonium chloride, cetalkonium chloride, tetraethylammonium bromide, and tetraethylammonium hydroxide.

In some embodiments, the activated perlite and/or activated expanded perlite may further contain transition metal ions. For example, activated perlite and/or activated expanded perlite may include ions of Sc, Ti, V, Cr, Mn, Fe, Co, Ni, Cu, and Zn. These transition metal ions may form coordinate bonds with amines, ammonia, ethanolamine derivatives, and the like. Such an activated perlite (or an activated expanded perlite) with coordinated bonds may resemble a cationic surfactant. These cationic perlite particles are hydrophilic, and may further interact with coalescing agents present in the paint compositions. When the coalescing agents migrate to the surface during the curing of a paint to form a film, the activated perlite and the activated expanded perlite may also accompany them and migrate to the surface. The presence of activated perlite and/or activated expanded perlite at the surface of the film provides hydrophilic and self-cleaning properties to the film.

An exemplary coating embodiment is shown in FIG. 1. The coating 100 with activated perlite or activated expanded perlite is applied on a substrate 110. As water 120 evaporates, binder particles 130 pack against each other forming an irreversible networked structure. During this process, coalescing agents 140 along with perlite particles 150 may migrate to the surface. The activated perlite and/or the activated expanded perlite provides a hydrophilic surface to the coating, thus aiding in self-cleaning of the surface. These surfaces are able to interact and retain water molecules for relatively longer periods of time, thus keeping the surface wet and helping water to sheathe off and remove dirt.

In some embodiments, the activated perlite or the activated expanded perlite may be present in a coating composition at about 1 to about 15 weight percent, at about 1 to about 10 weight percent, at about 1 to about 5 weight percent, at about 1 to about 3 weight percent, or at about 1 to about 2 weight percent. Specific examples include about 1 weight percent, about 5 weight percent, about 7 weight percent, about 10 weight percent, about 12 weight percent, about 15 weight percent of the total weight, and ranges between (and including the endpoints of) any two of these values.

In some embodiments, the coating composition may include coalescing agents, such as ester alcohols, benzoate ethers, glycol ethers, glycol ether esters, n-methyl-2-pyrrolidone and the like. The coalescing agents may be block copolymer surfactants, such as ethylene glycol butyl ether, diethylene glycol butyl ether, triethylene glycol butyl ether, and combinations thereof. In some embodiments, the coalescing agents may be present in the coating composition at about 1 to about 10 weight percent, at about 1 to about 8 weight percent, at about 1 to about 5 weight percent, at about 1 to about 3 weight percent, or at about 1 to about 2 weight percent. Specific examples include about 1 weight percent, about 3 weight percent, about 5 weight percent, about 6 weight percent, about 8 weight percent, about 10 weight percent of the total weight, and ranges between (and including the endpoints of) any two of these values.

In additional embodiments, the coating composition may contain one or more additives. These additives may alter properties of the paint made from the coating composition, such as shelf life, application and longevity, and health and safety. Such additives may be added, for example, during the manufacture of emulsion polymers in the paint or during the formulation of the paint itself. Illustrative additives may include initiators, rheology modifiers, preservatives, and the like. Initiators are a source of free radicals to initiate the polymerization process in which monomers form polymers. Coating compositions may contain a redox system initiator, such as ferrous and thiosulfate along with the persulfate salts, that promote polymerization at room temperature.

In some embodiments, thickeners and rheology modifiers may be also be added to coating compositions to achieve desired viscosity and flow properties. Thickeners function by forming multiple hydrogen bonds with the acrylic polymers, thereby causing chain entanglement, looping and/or swelling which results in volume restriction. Thickeners, such as cellulose derivatives including hydroxyethyl cellulose, methyl cellulose and carboxymethyl cellulose, may be used in the coating compositions.

In some embodiments, one or more preservatives may be added in the coating compositions in low doses to protect against the growth of microorganisms. Preservatives, such as methyl benzisothiazolinones, chloromethylisothiazolinones, barium metaborate and 1-(3-chloroallyl)-3,5,7-triaza-1-azoniaadamantane chloride, may be used.

In some embodiments, the coating composition may further contain one or more of the following additives: solvents, pigments, plasticizers, surfactants and the like. Surfactants may be used, for example, to create the micelles for particle formation, as well as long-term particle stabilization, and these provide stability through electrostatic and steric hindrance mechanisms. Both ionic and non-ionic surfactants may be used. Examples may include, but are not limited to, alkyl phenol ethoxylates, sodium lauryl sulfate, dodecylbenzene sulfonate, polyoxyethylene alkyl ethers, polyoxyethylene alkyl allyl ethers, acetylene glycols, polyoxyethylene, stearic acid and polyoxypropylene.

In some embodiments, one or more plasticizers may be added to the compositions to adjust the tensile properties of the paint film. Plasticizers include, for example, a glucose-based derivative, a glycerine-based derivative, propylene glycol, ethylene glycol, phthalates and the like.

The paints, according to the disclosure, may further comprise one or more pigments. The term "pigments" is intended to embrace, without limitation, pigmentary compounds employed as colorants, including white pigments, as well as ingredients commonly known in the art as "opacifying agents" and "fillers". Pigments may be any particulate organic or inorganic compound and may provide coatings the ability to obscure a background of contrasting color (hiding power).

In one embodiment, the coating compositions may comprise a binder. The binder can be an organic polymeric binder, a silicone polymeric binder, or both. In the broadest aspect, it is contemplated that any polymeric binder may be employed. In some embodiments, the polymeric binder is a water-dispersible polymer. The water-dispersible polymer may include, for example, a polymer or a copolymer of the following: alkylacrylate, alkyl methacrylate, allyl methacrylate, acrylic acid, methacrylic acid, acrylamide, 2-hydroxyethyl methacrylate, 2-hydroxypropyl methacrylate, thioethyl methacrylate, vinyl methacrylate, vinyl benzene, 2-hydroxyethyl acrylate, butyl acrylate, 2-ethylhexyl acrylate, vinyltrimethoxysilane, vinyltriethoxysilane, vinyl formate, vinyl acetate, vinyl propionate, vinyl butyrate, vinyl hexanoate, vinyltoluene, α-methyl styrene, chlorostyrene, styrenesulfonic acid, and combination thereof. Coating compositions may also include a single binder or a mixture of two or more polymeric binders that may be of the same class or different classes. For example, organic binders may be combined with a silicone-based binder.

In some embodiments, the activated perlite and/or the activated expanded perlite may be dispersed in inorganic binders. Inorganic binders may include, without limitation, alkali metal polysilicates, such as potassium polysilicate, sodium polysilicate, lithium polysilicate or the like.

In some embodiments, a method of making a coating composition includes contacting a perlite or an expanded perlite with a hydrophilic activating agent to form an activated perlite or an activated expanded perlite, and adding the activated perlite or the activated expanded perlite to the coating composition. The perlite or the expanded perlite may be contacted with the hydrophilic activating agents described herein, for example, by soaking or dipping the perlite in a solution containing hydrophilic activating agent. In addition, the hydrophilic activating agent solution may also be sprayed on the perlite. The perlites and the hydrophilic activating agents may be contacted for about 0.5 hours to about 4 hours, for about 0.5 hours to about 3 hours, for about 0.5 hours to about 2 hours, or for about 0.5 hours to about 1 hour. Specific examples include about 0.5 hours, about 1 hour, about 1.5 hours, about 2 hours, about 3 hours, about 4 hours, and ranges between (and including the endpoints of) any two of these values. After the formation of the activated perlite or activated expanded perlite, the perlites may be separated from the excess hydrophilic activating agent in the solution by any method known in the art, such as filtration, decantation, centrifugation, drying, and the like.

The activated perlite or the activated expanded perlite may be added to a paint composition during any step of the paint preparation or before a consumer uses the paint. The activated perlite or the activated expanded perlite may be present as a separate component or a kit, and mixed with the paint before use. For example, the end consumer may add the activated perlite or the activated expanded perlite to any conventional paint formulation before use.

The present disclosure relates to hydrophilic coating compositions which when applied to a substrate and cured, results in a hydrophilic coating. A hydrophilic coating composition may be a liquid hydrophilic coating composition, such as a solution or a dispersion comprising a liquid medium. Any liquid medium that allows application of the hydrophilic coating formulation on a surface would suffice. Examples of liquid media are alcohols, like methanol, ethanol, propanol, butanol or respective isomers and aqueous mixtures thereof, acetone, methylethyl ketone, tetrahydrofuran, dichloromethane, toluene, and aqueous mixtures or emulsions thereof or water. The coating compositions of the present disclosure may also be a latex emulsion, non-aqueous dispersion, or powder. The hydrophilic coating composition may further comprise components that when cured are converted into the hydrophilic coating, and thus remain in the hydrophilic coating after curing. As used herein, curing refers to physical or chemical hardening or solidifying by any method, for example heating, cooling, drying, crystallization or curing as a result of a chemical reaction, such as radiation-curing or heat-curing. In the cured state, all or a portion of the components in the hydrophilic coating formulation may be cross-linked forming covalent linkages between all or a portion of the components, for example by using UV or electron beam radiation. In addition, in the cured state, all or a portion of the components may be ionically bonded, bonded by dipole-dipole type interactions, or bonded via Van der Waals forces or hydrogen bonds.

To apply the hydrophilic coating on the substrate, a primer coating may be used in order to provide a binding between the hydrophilic coating and the substrate. In some instances, the primer coating facilitates adhesion of the hydrophilic coating to the substrate. The binding between the primer coating and the hydrophilic coating may occur due to covalent or ionic links, hydrogen bonding, or polymer entanglements. These primer coatings may be solvent-based, water-based (latexes or emulsions) or solvent-free and may comprise linear, branched and/or cross-linked components. Typical primer coatings that could be used include for example, polyether sulfones, polyurethanes, polyesters, polyacrylates, polyamides, polyethers, polyolefins and copolymers thereof. The hydrophilic coatings of the present disclosure can also be applied on the substrate without a primer.

The coatings may be used as a decorative coating, an industrial coating, a protective coating, a UV-protective coating, a self-cleaning coating, a biocidal coating, or any combination thereof. The coatings may generally be applied to any substrate. The substrate may be an article, an object, a vehicle or a structure. Although no particular limitation is imposed on the substrate to be used in the present disclosure, exemplary substrates include an exterior of a building, vehicles, bridges, airplanes, metal railings, fences, glasses, plastics, metals, ceramics, wood, stones, cement, fabric, paper, leather, walls, pipes, vessels, medical devices, and the like. The coating may be applied to a substrate by spraying, dipping, rolling, brushing, or any combination thereof.

The activated perlite or the activated expanded perlite in the coating compositions disclosed herein may behave as an ionic surfactant due to the presence of the hydrophilic activating agents, such as amines. The accumulation of the perlites at the surface of the coating may provide a detergent surface on the substrate with self-cleaning properties. Further, the presence of cationic quaternary ammonium salts in the perlite may provide antibacterial and antifungal properties to the coating. Such coatings with biocidal properties may be used in water treatment plants, swimming pools, aquariums, toilets, hospitals, food processing industries, restaurants, waste management industries and the like. In addition, the presence of perlites in the coating may also enhance the thermal insulating and fire retardant properties of the coating. Furthermore, the presence of amine derivatives in perlites may also protect the coating from oxidation and UV-radiation-induced deterioration. The perlites in the coating may also absorb polar organic compounds, such as ethylene and ammonia. Such coatings may find use in biofilters, food processing facilities, large shipping containers, produce storage facilities, and the like. The various beneficial properties of the coatings can be evaluated relative to an otherwise similar coating lacking the activated perlite or activated expanded perlite.

EXAMPLES

Example 1

Preparation of a Hydrophilic Coating

About 10 grams of fine expanded perlite is mixed with 100 mL solution of 1 M diethanolamine for 1 hour. The expanded perlite soaked with diethanolamine is separated, dried and mixed with 40 grams of chromium oxide pigment, 2 grams of thickener (hydroxyethyl cellulose), 150 grams of solvent (water), 70 grams of binder (methyl methacrylate), 0.3 grams of coalescing agent (2,2,4-trimethyl-1,3-pentanediolmono(2-methylpropanoate)), and 0.05 grams of bactericide. The components are mixed under high shear for 30 minutes.

Example 2

Preparation of a Hydrophilic Coating

About 10 grams of fine expanded perlite is mixed with 100 mL solution of 1 M anhydrous hydrazine for 1 hour. The expanded perlite soaked with hydrazine is separated, dried and mixed with 40 grams of $TiO_2$, 2 grams of thickener (hydroxyethyl cellulose), 150 grams of solvent (water), 70 grams of binder (methyl methacrylate), 0.3 grams of coalescing agent (2,2,4-trimethyl-1,3-pentanediolmono(2-methylpropanoate)), and 0.05 grams of bactericide. The components are mixed under high shear for 30 minutes.

Example 3

Evaluation of Hydrophilic Property

The hydrophilic coating of Example 2 is coated on a glass surface and dried at room temperature. The surface free energy and the water droplet contact angle of the hydrophilic coating are measured as follows. A Zisman plotting method is employed for measuring the surface free energy. The surface tension of various concentrations of the aqueous solution of magnesium chloride is plotted along the X-axis, and the contact angle in terms of cos θ is plotted along the Y-axis. A graph with a linear relationship between the two is obtained. The graph is extrapolated such that the surface tension at contact angle 0° is measured and is defined as the surface free energy of the solid. The surface free energy of the glass surface measured will be 85 milliNewton/meter.

Example 4

Anti-Fouling Properties

A hydrophilic coating of Example 1 is coated on a wooden surface. A similar wooden surface is coated with an otherwise similar coating without activated expanded perlite. After drying the coating, the surfaces are exposed to running water for one month. At the end of the period, the wooden surfaces are checked for visible peeling of the paint and growth of organisms such as algae. The wooden surface coated with the coating containing the activated expanded perlite will be free of algae, while the other surface will exhibit the growth of algae.

Example 5

An Object Coated with Hydrophilic Paint

A metal table is painted with a hydrophilic coating of Example 1 and is allowed to dry at room temperature. The surface free energy of the table is measured as explained in Example 3 and will be 85 milliNewton/meter. The anti-fouling property of the coating is measured as follows: A line is drawn on the above mentioned coated table using oily ink A similar line is also drawn on a table which is coated with an otherwise similar coating without activated expanded perlite. An uncoated table is also used in this experiment. A water jet is continuously applied on all three surfaces and periodically checked whether the oily line is still present. The oily ink applied on the table with activated expanded perlite coating will be erased after about 1 minute, whereas the oily line on the un-coated table or on the table lacking perlite coating will be un-changed and visible.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figure, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub-ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A coating composition, comprising:
    at least one polymeric binder;
    an activated perlite or an activated expanded perlite dispersed in the at least one polymeric binder; and
    a hydrophilic activating agent on the activated perlite or activated expanded perlite.

2. The coating composition of claim 1, wherein the hydrophilic activating agent comprises an amine, ammonia, a hydroxylamine, ethanolamine, an ethanolamine derivative, a hydrazine, a hydrazine derivative, a quaternary ammonium salt, or any combination thereof.

3. The coating composition of claim 1, wherein the activated perlite or the activated expanded perlite further comprises transition metal ions.

4. The coating composition of claim 1, further comprising a solvent, a pigment, a coalescing agent, a rheology modifier, a plasticizer, a surfactant, or any combination thereof.

5. The coating composition of claim 1, further comprising a coalescing agent comprising a block copolymer surfactant including ethylene glycol butyl ether, diethylene glycol butyl ether, triethylene glycol butyl ether, or any combination thereof.

6. The coating composition of claim 1, wherein the at least one polymeric binder includes silicone polymers, organic polymers, or both.

7. The coating composition of claim 1, wherein the at least one polymeric binder includes a polymer of alkylacrylate, alkyl methacrylate, allyl methacrylate, acrylic acid, methacrylic acid, acrylamide, 2-hydroxyethyl methacrylate, 2-hydroxypropyl methacrylate, thioethyl methacrylate, vinyl methacrylate, vinyl benzene, 2-hydroxyethyl acrylate, butyl acrylate, 2-ethylhexyl acrylate, vinyltrimethoxysilane, vinyltriethoxysilane, vinyl formate, vinyl acetate, vinyl propionate, vinyl butyrate, vinyl hexanoate, vinyltoluene, α-methyl styrene, chlorostyrene, or styrenesulfonic acid, a copolymer of any of the foregoing, or any combination thereof.

8. The coating composition of claim 1, wherein the activated perlite or the activated expanded perlite is present at about 1 weight percent to about 15 weight percent of the coating composition.

9. A method of coating a substrate, the method comprising:
    applying a coating composition to the substrate, wherein the coating composition includes:
        at least one polymeric binder;
        an activated perlite or an activated expanded perlite dispersed in the at least one polymeric binder; and
        a hydrophilic activating agent on the activated perlite or activated expanded perlite.

10. The method of claim 9, wherein the hydrophilic activating agent comprises an amine, ammonia, a hydroxylamine, ethanolamine, an ethanolamine derivative, a hydrazine, a hydrazine derivative, a quaternary ammonium salt, or any combination thereof.

11. The method of claim 9, wherein the activated perlite or the activated expanded perlite further comprises transition metal ions.

12. The method of claim 9, wherein applying the coating composition includes applying the coating composition as a decorative coating, an industrial coating, a protective coating, a UV-protective coating, a self-cleaning coating, a biocidal coating, or any combination thereof.

13. The method of claim 9, wherein applying the coating composition to the substrate comprises applying the coating by one or more of the following:
    brushing the coating composition on the substrate;
    dipping the substrate in the coating composition;
    spraying the coating composition on the substrate;
    spreading the coating composition on the substrate; and
    rolling the coating composition on the substrate.

14. The method of claim 9, wherein applying the coating composition to the substrate includes applying the coating composition on a wall, a pipe, or a vessel.

15. A coated article, comprising:
a substrate; and
a coating composition on the substrate, wherein the coating composition includes:
at least one polymeric binder;
an activated perlite or an activated expanded perlite dispersed in the at least one polymeric binder; and
a hydrophilic activating agent on the activated perlite or activated expanded perlite.

16. A method of making a coating composition, the method comprising:
contacting a perlite or an expanded perlite with a hydrophilic activating agent to form an activated perlite or an activated expanded perlite; and
adding the activated perlite or the activated expanded perlite to a composition, wherein the composition includes at least one polymeric binder and a liquid medium.

17. The method of claim 16, wherein contacting the perlite or the expanded perlite with the hydrophilic activating agent includes contacting the perlite or the expanded perlite with an amine, ammonia, a hydroxylamine, ethanolamine, an ethanolamine derivative, a hydrazine, a hydrazine derivative, a quaternary ammonium salt, or any combination thereof.

18. The method of claim 16, wherein contacting the perlite or the expanded perlite with the hydrophilic activating agent comprises mixing the perlite or the expanded perlite with the hydrophilic activating agent for about 0.5 hour to about 4 hours.

19. The method of claim 18, further comprising removing the unreacted hydrophilic activating agent.

20. The method of claim 16, further comprising adding to the composition a solvent, a pigment, a coalescing agent, a rheology modifier, a plasticizer, a surfactant, or any combination thereof.

21. The method of claim 16, further comprising mixing a coalescing agent in the composition, the coalescing agent comprising a block copolymer surfactant including ethylene glycol butyl ether, diethylene glycol butyl ether, triethylene glycol butyl ether, or any combination thereof.

22. The method of claim 16, wherein adding the activated perlite or the activated expanded perlite to the coating composition comprises adding the activated perlite or the activated expanded perlite in an amount of about 1 weight percent to about 15 weight percent of the coating composition.

23. The coating composition of claim 1, wherein the activated perlite or activated expanded perlite dispersed in the at least one polymeric binder is present at an outer surface of the coating composition.

24. The coating composition of claim 1, further comprising a coalescing agent, wherein the activated perlite or activated expanded perlite dispersed in the at least one polymeric binder is associated with the coalescing agent and the coalescing agent is present in the coating composition at an outer surface of the coating composition.

25. The method of claim 9, further comprising:
wherein the coating composition includes a coalescing agent, and
causing at least some of the coalescing agent and the activated perlite or activated expanded perlite to migrate to a surface of the coating composition.

26. The method of claim 25, wherein causing at least some of the coalescing agent and the activated perlite or activated expanded perlite to migrate to a surface of the coating composition includes curing the coating composition.

27. The method of claim 9, further comprising, prior to applying a coating composition to the substrate, applying a primer coating to the substrate to provide a bond between the coating composition and the substrate.

28. The method of claim 9, wherein:
the coating composition further includes a coalescing agent, and
the activated perlite or activated expanded perlite dispersed in the at least one polymeric binder is associated with the coalescing agent and the coalescing agent is present in the coating composition at an outer surface of the coating composition.

29. The coated article of claim 15, wherein the activated perlite or activated expanded perlite dispersed in the at least one polymeric binder is present at an outer surface of the coating composition.

30. The coated article of claim 15, wherein:
the coating composition further includes a coalescing agent, and
the activated perlite or activated expanded perlite dispersed in the at least one polymeric binder is associated with the coalescing agent and the coalescing agent is present in the coating composition at an outer surface of the coating composition.

* * * * *